(12) United States Patent
Gaudl et al.

(10) Patent No.: US 7,923,481 B2
(45) Date of Patent: Apr. 12, 2011

(54) RADIATION CURABLE COMPOSITION AND METHOD FOR PRODUCING THE SAME

(75) Inventors: Kai-Uwe Gaudl, Hohen Nevendorf (DE); Artur Lachowicz, Berlin (DE)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/682,101

(22) PCT Filed: Oct. 31, 2008

(86) PCT No.: PCT/JP2008/069847
§ 371 (c)(1),
(2), (4) Date: Apr. 8, 2010

(87) PCT Pub. No.: WO2009/057737
PCT Pub. Date: May 7, 2009

(65) Prior Publication Data
US 2010/0210751 A1     Aug. 19, 2010

(30) Foreign Application Priority Data

Oct. 31, 2007 (JP) ................................. 2007-282887

(51) Int. Cl.
*C09D 11/10* (2006.01)
*C08L 71/08* (2006.01)
*C08L 63/00* (2006.01)
*C08G 65/00* (2006.01)

(52) U.S. Cl. ........... 522/84; 522/167; 524/800; 528/417
(58) Field of Classification Search ..................... 522/84, 522/168, 25, 31, 167; 528/417, 408; 524/800
See application file for complete search history.

(56) References Cited

U.S. PATENT DOCUMENTS

| | | | | |
|---|---|---|---|---|
| 5,750,590 A * | 5/1998 | Schaefer et al. | ............. | 523/115 |
| 6,166,101 A | 12/2000 | Takami | | |
| 6,166,228 A * | 12/2000 | Gaudl et al. | .................. | 549/510 |
| 6,232,361 B1 | 5/2001 | Laksin et al. | | |
| 6,906,116 B2 * | 6/2005 | Nishikubo et al. | ............ | 522/104 |
| 7,144,929 B2 * | 12/2006 | Sasa | ............................... | 522/170 |
| 2001/0018477 A1 | 8/2001 | Kumakura | | |
| 2003/0062125 A1 | 4/2003 | Takamatsu et al. | | |

FOREIGN PATENT DOCUMENTS

| | | |
|---|---|---|
| EP | 0848294 A1 | 6/1998 |
| EP | 1138739 A1 | 10/2001 |
| EP | 1277776 A1 | 1/2003 |
| JP | 2002-531678 | 9/2002 |
| JP | 2003-096184 A | 4/2003 |
| JP | 2007-217471 A | 8/2007 |
| WO | WO-00/34400 A1 | 6/2000 |
| WO | WO-2007/119582 A1 | 10/2007 |

OTHER PUBLICATIONS

Office Action mailed Mar. 3, 2009, issued on related Japanese Patent Application No. 2008-556601 with English translation thereof.
International Search Report dated Dec. 2, 2008, issued on PCT/JP2008/069847.
Supplementary European Search Report dated Dec. 28, 2010, issued for the corresponding European Patent Application No. 08845616.5.

* cited by examiner

*Primary Examiner* — Susan W Berman
(74) *Attorney, Agent, or Firm* — Edwards Angell Palmer & Dodge LLP

(57) ABSTRACT

The present invention relates to a composition which is curable by radiation such as an ultraviolet ray or an electron beam. Specifically, the present invention relates to a curable composition which is useful for coatings and inks. The present invention provides a radiation curable composition that is highly cationically polymerizable and highly adhesive to substrates. A radiation curable composition of the present invention includes, as essential ingredients, a cationically polymerizable compound (a) represented by the following general formula 1 (wherein, R represents an alkyl group of 1 to 10 carbon atoms, $R^1$ represents a hydrogen atom or a methyl group, n represents a number from 1 to 4, and m represents a number from 0 to 10); a cationic photoinitiator (b); and water (c).

8 Claims, No Drawings

RADIATION CURABLE COMPOSITION AND METHOD FOR PRODUCING THE SAME

TECHNICAL FIELD

The present invention relates to a composition which is curable by radiation such as an ultraviolet ray or an electron beam. Specifically, the present invention relates to a curable composition which is useful for coatings and inks.

BACKGROUND ART

Radiation curable materials are used over wide ranges in the field of coatings and printing inks. Usually, such materials can be cured by radiation of a ultraviolet ray or an electron beam, through radical or cationic reaction.

In these curing reactions, cationically curable materials such as an epoxy compound and an oxetane compound do not involve an issue of oxygen inhibition in the curing reaction, which has been seriously problematic for radical polymerization systems. Thus, advances have been made in the study of such cationically curable materials in the field of coatings and printing inks. However, generally speaking, such cationically curable compounds are sensitive to air humidity, which as a result makes it difficult to control the physical properties of the cured product of a printing ink or a coating.

To solve this problem, a technique is known in which a hydroxy-containing mono-oxetane compound such as 3-ethyl-3-hydroxymethyloxetane is included as a reactive diluent, to thereby yield an aqueous cationically curable composition hardly sensitive to humidity that has been so demanded for environmental reasons in recent years (see Patent Document 1).

As disclosed in Patent Document 1, when a hydroxy-containing mono-oxetane compound is used as a reactive diluent in an aqueous cationically curable composition, the sensitivity to humidity can be lowered and the viscosity of the composition can be reduced. Moreover, the compound can function as a compatibilizer for dissolving a water-insoluble and polyfunctional cationically curable compound such as an epoxy compound in water.

However, if this hydroxy-containing mono-oxetane compound is used as a reactive diluent, the curing speed is yet slow because the reactive diluent is monofunctional. Thus, no sufficient curability can be achieved. In addition, the crosslink density after curing decreases and the surface tension of an aqueous coating increases. Therefore, the wettability for nonporous/nonpolar plastic substrates and the adhesiveness to these plastic substrates are inferior.

Patent Document 1: U.S. Pat. No. 6,232,361 (from column 4 line 35 to column 5 line 12)

DISCLOSURE OF INVENTION

It is an object of the present invention to provide a radiation curable composition that is highly cationically polymerizable and highly adhesive to substrates.

The inventors of the present invention have earnestly studied to achieve the above object. As a result, they have completed the present invention relating to a radiation curable composition comprising, as essential ingredients, a cationically polymerizable compound (a) represented by the following general formula 1

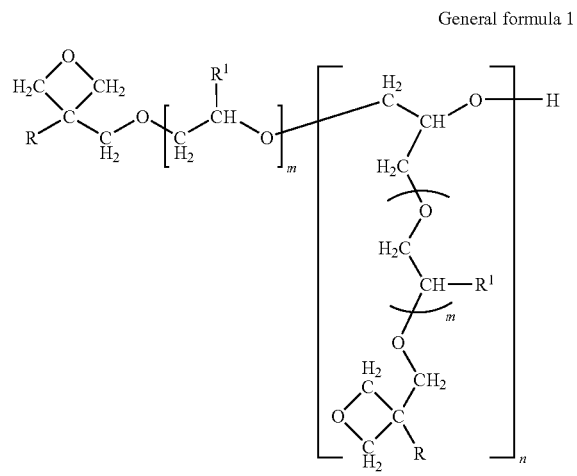

General formula 1

(wherein, R represents an alkyl group of 1 to 10 carbon atoms, $R^1$ represents a hydrogen atom or a methyl group, n represents a number from 1 to 4, and m represents a number from 0 to 10);

a cationic photoinitiator (b); and water (c).

Furthermore, the present invention also relates to a method for producing a radiation curable composition, comprising:

reacting an oxetane alcohol represented by the following general formula 2 with an epihalohydrin in the presence of a basic catalyst at a temperature of 25° C. to 30° C., to thereby obtain a cationically polymerizable compound (a) represented by the following general formula 1

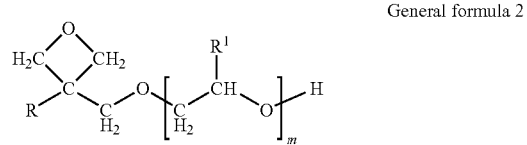

General formula 2

(wherein, R[1] represents a hydrogen atom or a methyl group, and m represents a number from 0 to 10)

General formula 1

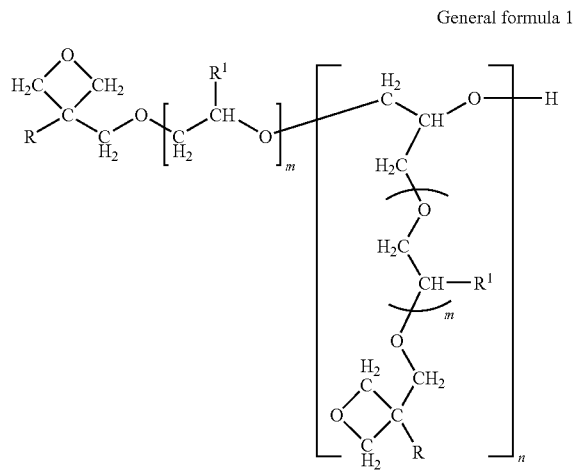

(wherein, R represents an alkyl group of 1 to 10 carbon atoms, R[1] represents a hydrogen atom or a methyl group, n represents a number from 1 to 4, and m represents a number from 0 to 10);

mixing and compatibilizing the obtained cationically polymerizable compound (a) with water (c) to thereby obtain an aqueous solution; and then adding a photoinitiator (b) to the obtained aqueous solution.

Furthermore, the present invention also relates to a cured product of the above-mentioned epoxy resin compound.

EFFECT OF THE INVENTION

The present invention can provide a radiation curable composition that is highly cationically curable by radiation such as an ultraviolet ray or an electron beam and highly adhesive to plastic substrates though it is an aqueous composition.

BEST MODE FOR CARRYING OUT THE INVENTION

Hereunder is a detailed description of the present invention.

The cationically polymerizable compound (a) for use in the present invention is represented by the following general formula 1

General formula 1

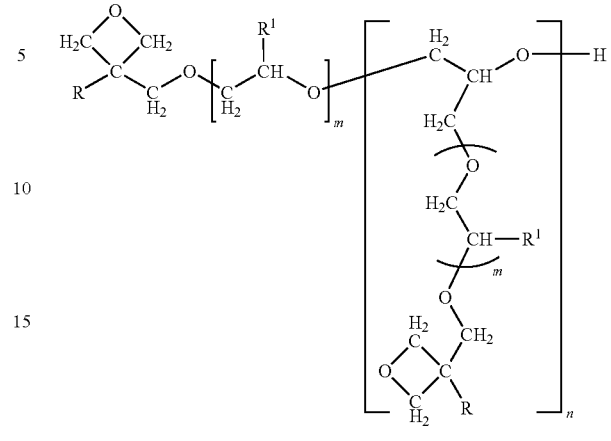

(wherein, R represents an alkyl group of 1 to 10 carbon atoms, R[1] represents a hydrogen atom or a methyl group, n represents a number from 1 to 4, and m represents a number from 0 to 10).

In the present invention, when used as a main ingredient of an aqueous cationically curable composition, or as a reactive diluent for dissolving a polyfunctional cationically polymerizable compound (d) described later, the compound (a) can achieve a remarkably fast curing speed and an excellent curability as compared to cases where the conventional 3-ethyl-3-hydroxymethyloxetane is used as a reactive solvent. Furthermore, when contained in an aqueous solution, the compound (a) can lower the surface tension of the coat film surface and thereby remarkably improve the adhesiveness to plastic substrates. Still further, although the molecular weight of the compound represented by the general formula 1 is high, the compound (a) has a low viscosity and thus is useful as a binder or a vehicle of a coating or an ink.

The cationically polymerizable compound (a) represented by the aforementioned general formula 1 also functions as a compatibilizer between water and a water-insoluble cationically curable compound such as an epoxy compound, a vinyl ether compound, or an oxetane compound, in general. For this reason, the radiation curable composition of the present invention can form a monophasic solution having a notably low viscosity.

The cationically polymerizable compound (a) represented by the aforementioned general formula can be specifically exemplified by the following compounds.

a-1

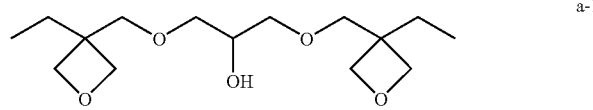

a-2

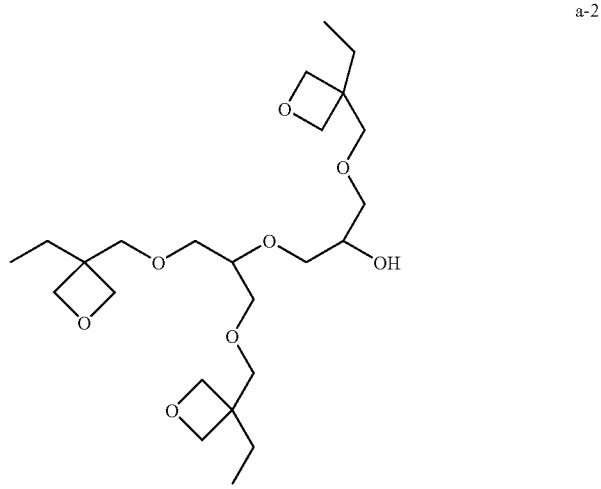

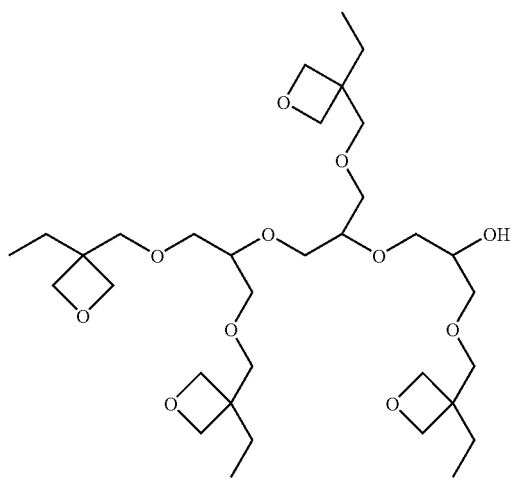

a-3

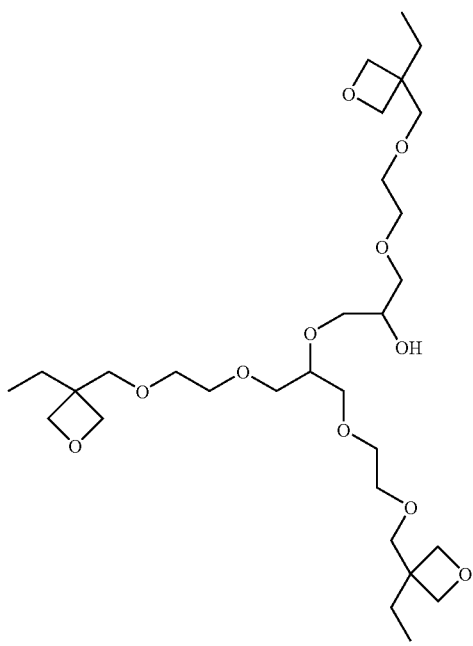

a-4

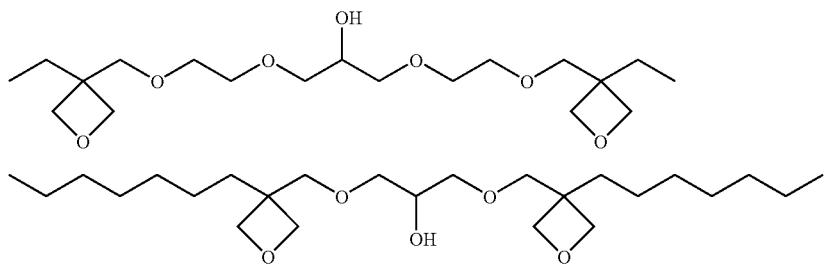

a-5

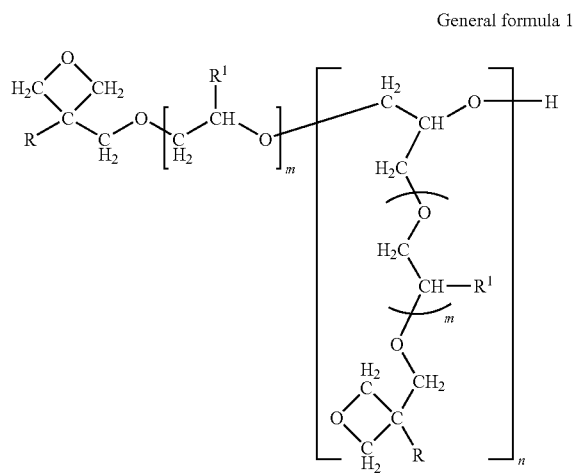

a-6

Of these compounds, preferred are difunctional oxetanes since they are highly soluble with water. On the other hand, trifunctional or tetrafunctional oxetane compounds represented by the aforementioned items a-2, a-3, and a-4 can remarkably improve the curability, increase the crosslink density of the cured product, and much improve the adhesiveness to plastic substrates.

From these aspects, among those represented by the following general formula 1

General formula 1

(wherein, R represents an alkyl group of 1 to 10 carbon atoms, $R^1$ represents a hydrogen atom or a methyl group, and m represents a number from 0 to 10), oligomer type compounds in which n represents a number of 2 to 4 are preferred in terms of the curability and the adhesiveness, and compounds satisfying n=1 are preferred in terms of the water solubility. Therefore, considering the balance between these properties, a mixture of compounds satisfying n=1, 2, and 3 are preferred. Specifically, the abundance ratio thereof is preferably such that the compound satisfying n=1 accounts for 20 to 40% by mass, the compound satisfying n=2 accounts for 50 to 70% by mass, and the compound satisfying n=3 accounts for 1 to 10% by mass, based on the total mass of these compounds satisfying n=1, 2, and 3.

In addition, although m represents a number of 0 to 10 in the general formula 1, preferred are ethoxylated oxetane compounds represented by the aforementioned items a-4 and a-5 in which m represents 1 because they offer excellent water solubility regardless of their high molecular weights. On the other hand, compounds satisfying m=0 in the general formula 1 are preferred because they offer better curability. Considering these performances, it is preferable that m represents 0 to 3 in the general formula 1.

Here, the compounds satisfying m=0 in the general formula 1 specifically refer to compounds represented by the following general formula 1'.

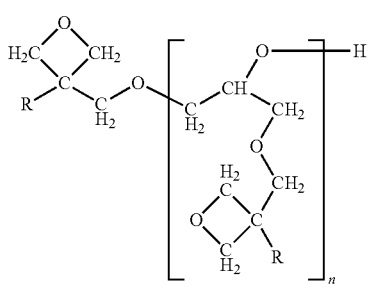

General formula 1'

(wherein, R represents an alkyl group of 1 to 10 carbon atoms, and n represents a number from 1 to 4.)

Accordingly, considering the curability and the adhesiveness, a mixture of compounds represented by the aforementioned formula 1' which satisfy n=1, 2, and 3 is preferred. In particular, the ratio is preferably such that the compound satisfying n=1 accounts for 20 to 40% by mass, the compound satisfying n=2 accounts for 50 to 70% by mass, and the compound satisfying n=3 accounts for 1 to 10% by mass, based on the total mass of these compounds satisfying n=1, 2, and 3.

In addition, R in the formula 1' preferably represents a hydrogen atom or a methyl group in terms of the water solubility.

As described above, the thus detailed cationically polymerizable compound (a) can be produced by reacting an oxetane alcohol represented by the following formula 2 with an epihalohydrin in the presence of a basic catalyst.

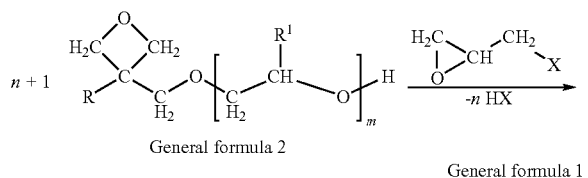

General formula 2      General formula 1

(wherein, R represents an alkyl group of 1 to 10 carbon atoms, $R^1$ represents a hydrogen atom or a methyl group, n represents a number from 1 to 4, m represents a number from 0 to 10, and X represents a chlorine atom or a bromine atom.)

Here, the oxetane alcohol represented by the general formula 2 can be specifically exemplified by 3-methyl-3-hydroxymethyloxetane, 3-ethyl-3-hydroxymethyloxetane, 3-n-heptyl-3-hydroxymethyloxetane, 3-ethyl-3-hydroxy-poly(ethyleneoxy)methyloxetane, and 3-ethyl-3-hydroxy-poly(propyleneoxy)methyloxetane. Here, although m represents a number from 0 to 10 in the general formula 2; if m represents 1 or more, it is preferable that m represents 1 or 2 in terms of the curability.

Meanwhile, the epihalohydrin can be exemplified by epichlorohydrin and epibromohydrin, although in the present invention epichlorohydrin is preferred because it reacts well with the cationically polymerizable compound (a).

Moreover, the basic catalyst usable herein can be exemplified by sodium hydroxide, potassium hydroxide, and potassium carbonate. Of these, sodium hydroxide is particularly preferred.

The reaction between the oxetane alcohol and the epichlorohydrin can be carried out at 0° C. to 120° C., and preferably at 25° C. to 80° C.

The ratio of the oxetane alcohol, the epihalohydrin, and the basic catalyst used in the reaction is preferably within a range of (oxetane alcohol/epihalohydrin/basic catalyst)=(8/1/5) to (1/1/1.05) in molar ratio, and particularly preferably a range of (3/1/1.2) to (1.5/1/1.1).

After the reaction, generated salts or excessive inorganic bases, if any, can be removed by filtration. Upon the filtration, an inactive solvent such as toluene can be added so as to accelerate the filtration of a variety of mixtures.

If the remaining mixture solution is still alkaline, it is preferable to neutralize the solution until the pH is shown to be neutral by an indicator of phenolphthalein. The neutralized remaining mixture solution is then distilled under reduced pressure so as to remove generated water or excessive oxetane raw materials.

The crude product is either filtrated again by pressure filtration or left intact for direct use as the radiation curable composition. If necessary, low molecular weight compounds are purified by distillation and high molecular weight compounds are purified by washing or extraction.

For example, 1,3-bis(3-alkyloxetane-3-yl-methoxy)-propane-2-ol represented by the following structural formula can be obtained as a distillate by short-time distillation of a crude product under reduced pressure.

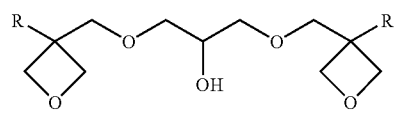

Here, R represents an alkyl group of 1 to 10 carbon atoms.

The distillation residue is comprised of relatively high molecular weight compounds represented by the general formula 1, and can be diluted with water depending on the amount. The distillation product and the residue are both useful as aqueous cationic UV curable substances.

The compound represented by the formula 1 can be cured by itself as a curable ingredient. However, as for the abovementioned composition in the present invention, it is preferable to jointly use a polyfunctional cationically polymerizable compound (d) selected from the group consisting of a polyfunctional epoxy compound, a polyfunctional vinyl ether compound, and a polyfunctional oxetane compound, and the cationically polymerizable compound (a) as a reactive diluent/compatibilizer.

The polyfunctional epoxy compound used herein can be exemplified by 2,2-bis(3',4'-epoxycyclohexyl)propane, 3,4-epoxycyclohexylmethyl-3',4'-epoxycyclohexylcarboxylate, bis(3,4-epoxycyclohexylmethyl)adipate, limonene diepoxide, vinylcyclohexene diepoxide, and cyclooctadiene diepoxide.

Moreover, the polyfunctional vinyl ether compound can be exemplified by tripropylene glycol divinyl ether, triethylene glycol divinyl ether, and tetraethylene glycol divinyl ether.

The polyfunctional oxetane compound can be exemplified by bis(3-ethyl-3-oxetanylmethyl)ether.

Of these, polyfunctional epoxy compounds are preferred since the coat film, that is, the resulting cured product, has excellent durability and excellent adhesiveness to plastic substrates. Particularly preferred are alicyclic epoxy compounds typified by 3,4-epoxycyclohexylmethyl-3',4'-epoxycyclohexylcarboxylate.

Next, the cationic photoinitiator (b) for use in the radiation curable composition of the present invention can be exemplified by triarylsulfonium salts such as triphenylsulfonium hexafluorophosphate and triphenylsulfonium hexafluoroantimonite, and aryl iodonium salts such as diaryliodonium hexafluoroantimonate and bisdodecylphenyliodonium hexafluoroantimonate.

Of these, triphenylsulfonium hexafluorophosphate is preferred in terms of the reactivity.

The water (c) is used as a solvent in the aqueous solution of the radiation curable composition of the present invention. In order to obtain a homogeneous aqueous solution, the amount of water can be selected so that the water content falls within a range of 20 to 80 mass parts per 100 mass parts of the total amount of the cationically polymerizable compound (a) and the water (c), or 100 mass parts of the total amount of the cationically polymerizable compound (a), the compound (d), and the water (c). Furthermore, for use in a composition of a printing ink or a coating, the amount of water (c) can be appropriately controlled to adjust the viscosity of the ink or the coating.

The radiation curable composition of the present invention as detailed above can be produced by the production method of the present invention, that is, by: reacting an oxetane alcohol represented by the following general formula 2 with an epihalohydrin in the presence of a basic catalyst at a temperature of 25° C. to 30° C., to thereby obtain a cationically polymerizable compound (a) represented by the following general formula 1

General formula 2

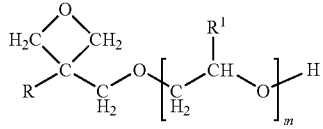

(wherein, $R^1$ represents a hydrogen atom or a methyl group, and m represents a number from 0 to 10)

General formula 1

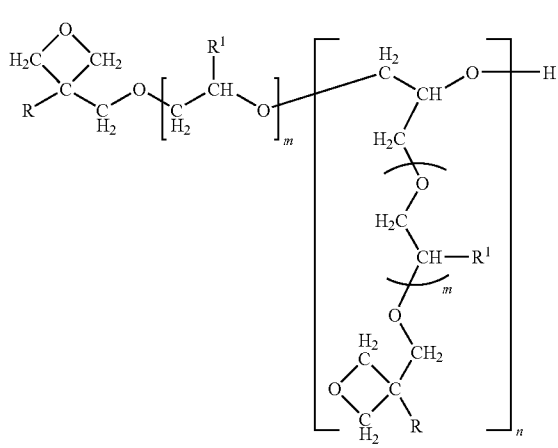

(wherein, R represents an alkyl group of 1 to 10 carbon atoms, $R^1$ represents a hydrogen atom or a methyl group, n represents a number from 1 to 4, and m represents a number from 0 to 10) (step 1);

mixing and compatibilizing the obtained cationically polymerizable compound (a) with water (c) to thereby obtain an aqueous solution (step 2); and then adding a photoinitiator (b) to the obtained aqueous solution (step 3).

Here, the step 1 is as described above in detail in the production method of the cationically polymerizable compound (a). In addition, if the polyfunctional cationically polymerizable compound (d) is included in the radiation curable composition of the present invention, it is preferable that the cationically polymerizable compound (a) is added to the polyfunctional cationically polymerizable compound (d) prior to the step 2. Moreover, it is preferable that the water (c) is carefully added under stirring until the viscosity and the moisture content reach the desired level, particularly in the step 2 as compared to the other respective steps.

The addition amount of water (c) to the system until a biphasic state appears varies depending on whether the polyfunctional cationically polymerizable compound (d) is hydrophilic or hydrophobic, or depending on the mass ratio of the compound (a) represented by the general formula 1 relative to the polyfunctional cationically polymerizable compound (d). When the biphasic state appears by adding a large amount of water, the biphasic state disappears by adding an appropriate amount of the cationically polymerizable compound (a).

The blending proportion of the cationically polymerizable compound (a), the cationic photoinitiator (b), and the water (c), or the blending proportion of the cationically polymerizable compound (a), the cationic photoinitiator (b), the water (c), and the polyfunctional cationically polymerizable compound (d) is not specifically limited, and may be appropriately selected/adjusted so that a monophasic aqueous solution can be formed. For example, in the former case where the polyfunctional cationically polymerizable compound (d) is not included, it is preferable that the cationically polymerizable compound (a) is within a range of 60 to 90 mass parts, the cationic photoinitiator (b) is within a range of 0.3 to 20 mass parts, and the water (c) is within a range of 10 to 30 mass parts, per 100 mass parts of the total amount of the cationically polymerizable compound (a), the cationic photoinitiator (b), and the water (c), in terms of the homogeneousness and the adhesiveness of the coat film. Moreover, in the latter case where the polyfunctional cationically polymerizable compound (d) is included, it is preferable that the cationically polymerizable compound (a) is within a range of 30 to 50 mass parts, the polyfunctional cationically polymerizable compound (d) is within a range of 30 to 50 mass parts, the cationic photoinitiator (b) is within a range of 0.3 to 20 mass parts, and the water (c) is within a range of 10 to 30 mass parts, per 100 mass parts of the total amount of the cationically polymerizable compound (a), the cationic photoinitiator (b), the water (c), and the polyfunctional cationically polymerizable compound (d), in terms of the homogeneousness and the adhesiveness of the coat film. Here, if the radiation curable composition of the present invention is used for a transparent coating, the blending proportion of the cationic photoinitiator (b) is preferably within a range of 2 to 6 mass parts per 100 mass parts of the total amount of (a) to (c), or 100 mass parts of the total amount of (a) to (d). Or, if the composition is used for an ink, the blending proportion thereof is preferably within a range of 4 to 12 mass parts.

The radiation curable composition of the present invention may also contain a dye or a pigment in addition to the above-mentioned ingredients. Appropriate examples of such a dye or a pigment can include Pigment Red 9, Pigment Yellow 114, Pigment Blue 15, or a mixture thereof.

The pigment-containing composition of the present invention exhibits an excellent adhesiveness as compared to conventional monofunctional oxetane-based reaction diluents. Furthermore, additives such as a silicone wax, a perfluoro compound, a filler, and a leveling agent may also be blended therein, so as to adjust the surface tension and the glossiness, or to improve the mechanical strength.

The radiation curable composition of the present invention can be cured by radiation such as an ultraviolet ray or an electron beam. The ultraviolet source can be exemplified by a high-voltage mercury bulb, a medium-voltage mercury bulb, a xenon bulb, a carbon arc lamp, a metal halide bulb, or sunlight. When ultraviolet is employed as the radiation, its UV energy is usually within a range of 10 to 3000 mJ/cm$^2$, and particularly preferably within a range of 20 to 500 mJ/cm$^2$. In addition, the bulb can be appropriately selected according to the absorption spectrum of the photoinitiator.

Moreover, the cationically polymerizable compound (a) can also be cured by another reaction in the radiation curing system mentioned above. For example, the cationically polymerizable compound (a) can be cationically cured by adding a strong acid such as hexafluorophosphoric acid. Such an acid catalyst can be applied in a blocked form of an ammonium salt or the like, and the compound (a) can be cured by a method well known to those skilled in the art for curing an epoxy resin, such as an epoxy compound curing reaction, or a reaction with polyamine, poly(carboxylic acid), or poly(acid anhydride).

The radiation curable composition of the present invention is useful for application as a curable coating or an ink such as a UV overprint varnish, a UV flexo ink, a UV jet ink, and a UV gravure ink. In each application thereof, the radiation curable composition of the present invention can exhibit a remarkable curability and an excellent adhesiveness to nonporous plastic substrates such as poly(ethylene terephthalate) and poly(carbonate).

EXAMPLES

Hereunder is a more detailed description of the present invention with reference to the following examples. However, the present invention is not to be limited by these examples.

Example 1

Synthesis of 1,3-bis(3-ethyloxetane-3-yl-methoxy)-propane-2-ol 3016.0 g (26.0 moles) of 3-ethyl-3-hydroxymethyloxetane and 500.0 g (12.5 moles) of sodium hydroxide were mixed. The mixture was purged with nitrogen gas and heated at 35° C.

Next, 920.0 g (10.0 moles) of epichlorohydrin was added over two hours while keeping the temperature in the system from exceeding 45° C. Then, the mixture was stirred overnight. In the next morning, the complete consumption of epichlorohydrin was confirmed by gas chromatography.

Subsequently, one liter of toluene was added, and the solid matter was filtrated off by suction (731 g of a solid salt was removed). The solution was neutralized with 16 g of acetic acid (indicator: phenolphthalein). Next, water and toluene were removed by azeotropy (1000 ml of toluene and 183 ml of water). The mixture was filtrated again to remove excessive 3-ethyl-3-hydroxymethyloxetane under reduced pressure (500 Pa), and 1270 g of 3-ethyl-3-hydroxymethyloxetane was collected. Then, the product was distilled under reduced pressure of 10 Pa at 150° C. to 160° C., thereby yielding 1,3-(3-ethyl-oxetane-3-yl-methoxy)-propane-2-ol (hereinunder, abbreviated as "BOP") as the distillation residue.

Yield: 705 g
Purity: >98% (GC, GPC)
[Analysis Results]
GC-MS measurement results (measured by TMS modification, fragments (m/z)): 29, 41, 43, 57, 69, 81, 99, 111, 131, 141, 157, 231

300 MHz $^1$H NMR (ppm, heavy acetone), Chemical shift (each peak corresponds to the symbol appended to the atom in the structural formula below): 4.45 (d, 4Hf/g), 4.34 (d, 4Hf/g), 4.02 (m, 1He), 3.68 (s, 4Hd), 3.63 (t, 4Hc), 1.80 (q, 4Hb), 0.96 (t, 6Ha)

300 MHz $^{13}$C NMR (ppm, heavy acetone), (each peak corresponds to the symbol appended to the atom in the structural formula below): 77 (C7), 74 (C5), 73 (C6), 69 (C4), 43 (C3), 29 (C2), 7 (C1)

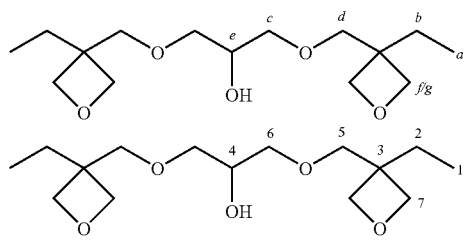

Example 2

Synthesis of ethoxylated 1,3-bis(3-ethyl-oxetane-3-yl-methoxy)-propane-2-ol 243.0 g (1.45 moles) of 3-ethyl-3-hydroxyethyloxy methyloxetane (Mw=169) and 33.0 g (0.8 moles) of sodium hydroxide were put in a 500 ml three necked flask equipped with a mechanical stirring blade, a thermometer, an addition funnel, and a reflux condenser. Then, 60.0 g (0.66 moles) of epichlorohydrin was added over 1.5 hours while keeping the temperature of the reaction mixture from exceeding 10° C. On completion of the dropwise addition, the stirring was continued while the state in the system was kept cool. The stirring was then continued at room temperature overnight (the system was cooled down at each time of heat generation, if any). Next, the precipitate was filtrated through a glass filter G3, and the filtrate was adjusted at pH6 by adding acetic acid. At this time, the color of the filtrate changed from light yellow to colorless. The produced precipitate was filtrated again through a paper filter. After the filtration, the filtrate was heated under reduced pressure (2 Pa) at 150° C. (oil bath temperature) to evaporate off easily-volatile compounds. The produced colorless and highly viscous residue was isolated by filtration, thus yielding 1,3-bis(3-ethyl-oxetane-3-yl-ethoxy-methoxy)-propane-2-ol.

Yield: 65 g
Number of hydroxyl groups (number of moles of hydroxyl groups per gram of the sample): 1.71 mmol/g

Example 3

Production of a Mixture of Water Reducible Oxetane Oligomers 464.0 g (4.0 moles) of 3-ethyl-3-hydroxymethyloxetane was mixed with 180.0 g (4.5 moles) of sodium hydroxide. This mixture was heated to 50° C. and added with 368.0 g (4.0 moles) of epichlorohydrin while keeping the temperature in the system from exceeding 80° C. (exothermic reaction). After the completion of the addition of epichlorohydrin, the mixture was stirred at 100° C. over 4 hours. Next, the mixture was mixed with 600 ml of toluene. The precipitated salt was removed by suction filtration. The mother liquor was extracted with 500 ml of water. Next, the water phase was neutralized with acetic acid and extracted with five-fold volume of diethyl ether. The ether layer was dried over sodium sulfate and filtrated. Then, the ether layer was distilled off.

The resultant product was distilled under reduced pressure in order to remove the residual ethyl-3-hydroxymethyloxetane. By so doing, a highly viscous and slightly colored liquid matter was yielded. This liquid was diluted with water until it reached 40% by mass. The resultant mixture was confirmed to have the following compositions by GC-MS and GPC.

TABLE 1

| Composition | Structural formula | Abundance ratio (%) |
|---|---|---|
| 1 | 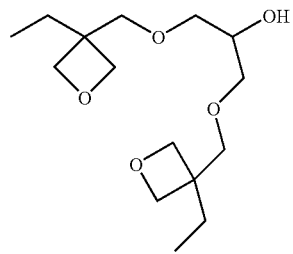 | 36 |
| 2 | 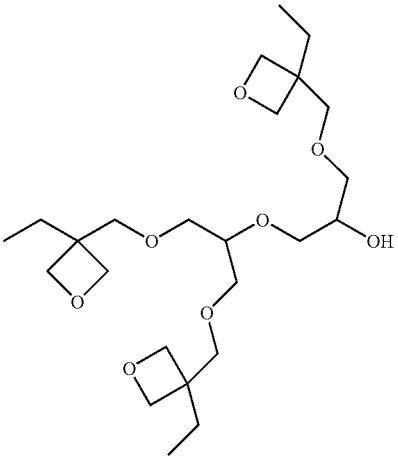 | 59 |
| 3 | 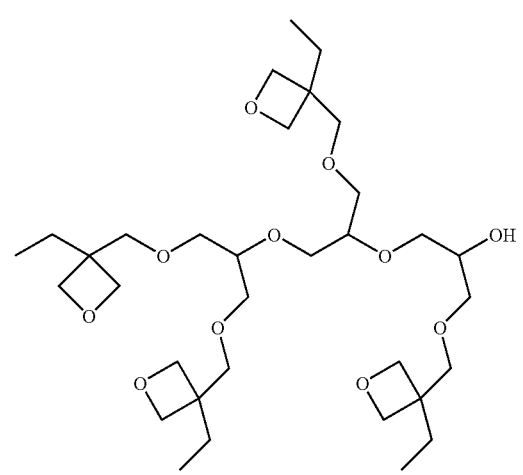 | 5 |

Example 4

Production of Radiation Curable Composition 39.0 g of 3,4-epoxycyclohexylmethyl-3',4'-epoxycyclohexane carboxylate ("Cyracure UVR 6105" manufactured by The Dow Chemical Company) was mixed with 45.0 g of the 1,3-bis(3-ethyl-oxetane-3-yl-methoxy)-propane-2-ol obtained in example 1, thereby yielding a transparent solution. Next, 3.0 g of a sulfonium salt-based photoinitiator solution ("Cyracure UVI 6992" manufactured by The Dow Chemical Company) was added and dissolved therein. Into the thus obtained transparent solution, 13.0 g of water was continuously added dropwise under stirring. The solution looked cloudy on the completion of the dropwise addition, but was left still until it looked transparent again. The thus obtained composition (hereinafter, abbreviated as "composition A1") had a viscosity of 69 mPa·s at 25° C.

Example 5

A composition was produced in the same manner as that of Example 4, except that the composition ratio as shown in the following table was employed. The obtained composition (hereinafter, abbreviated as "composition A2") had a viscosity of 69 mPa·s at 25° C.

TABLE 2

| Ingredients | Ratio |
| --- | --- |
| Cyracure UVR 6105 | 40% by mass |
| BOP | 44% by mass |
| Cyracure UVI 6992 | 3% by mass |
| Water | 13% by mass |

Abbreviations in the table are as follows.
Cyracure UVR 6105: 3,4-epoxycyclohexylmethyl-3',4'-epoxycyclohexane carboxylate ("Cyracure UVR 6105" manufactured by The Dow Chemical Company)
BOP: BOP obtained in example 1
Cyracure UVI 6992: a sulfonium salt-based photoinitiator solution ("Cyracure UVI 6992" manufactured by The Dow Chemical Company)

Example 6

A composition was produced in the same manner as that of Example 4, except that the composition ratio as shown in the following table was employed. The obtained composition (hereinafter, abbreviated as "composition A3") had a viscosity of 405 mPa·s at 25° C.

TABLE 3

| Ingredients | Ratio |
| --- | --- |
| Celloxide 2021 | 20% by mass |
| Oxetane oligomers | 67% by mass |
| Cyracure UVI 6992 | 3% by mass |
| Water | 10% by mass |

Abbreviations in the table are as follows.
Celloxide 2021: 3,4-epoxycyclohexenylmethyl-3',4'-epoxycyclohexane carboxylate ("Celloxide 2021" manufactured by Daicel Chemical Industries)
BOP oligomer: the mixture of water reducible oxetane oligomers obtained in example 3
Cyracure UVI 6992: a sulfonium salt-based photoinitiator solution ("Cyracure UVI 6992" manufactured by The Dow Chemical Company)

Comparative Example 1

A composition was produced in the same manner as that of example 4, except that the composition ratio as shown in the following table was employed. The obtained composition (hereinafter, abbreviated as "composition B1") had a viscosity of 54 mPa·s at 25° C.

TABLE 4

| Ingredients | Ratio |
| --- | --- |
| Cyracure UVR 6105 | 46% by mass |
| 3-ethyl-3-hydroxymethyloxetane | 36% by mass |
| Cyracure UVI 6992 | 3% by mass |
| Water | 15% by mass |

Abbreviations in the table are as follows.
Cyracure UVR 6105: 3,4-epoxycyclohexylmethyl-3',4'-epoxycyclohexane carboxylate ("Cyracure UVR 6105" manufactured by The Dow Chemical Company)
Cyracure UVI 6992: a sulfonium salt-based photoinitiator solution ("Cyracure UVI 6992" manufactured by The Dow Chemical Company)

[Curability Test]

The curability was measured by a tack-free test. Specifically speaking, a coat film was formed in a thickness of 6 μm or thinner, and the time required from UV radiation till the coat surface became tack-free was measured. The results are shown in the table below.

TABLE 5

|  | UV energy (mJ/cm$^2$) | Curability (seconds) |
| --- | --- | --- |
| Example 5 (composition A2) | 50 | 2 to 4 |
| Example 6 (composition A3) | 50 | 1 to 3 |
| Comparative Example 1 (composition B1) | 50 | 12 to 15 |

From the results of the UV curability test shown in Table 5 above, the aqueous cationically curable compositions having the compounds represented by the formula 1 were shown to have better curability. These results suggest that these compositions can be quickly cured and thus offer satisfactory productions of coatings and printing inks.

[Adhesive Test]

The composition A3 obtained in example 6 and the composition B1 obtained in comparative example 1 were coated in a thickness of 6 μm on PET substrates and polycarbonate substrates, by which coat films were obtained. The thus obtained coat films were cured by a fusion H bulb (187 W/cm) at a UV-energy of 500 mJ/cm$^2$, and were evaluated for the adhesive test by an X-cut tape test.

Specifically speaking, two 4 cm-cuts were made into the cured coat film with a 45 degree angle. A tape having a predetermined adhesion strength was strongly applied over the cuts and then removed. After the removal, the remaining area of the coat film was rated with the following scale: "100/100" completely remained; "90/100" 90% remained; "80/100" 80% remained; and "70/100" 70% remained. The tape used herein was "CT-405A" manufactured by Nichiban Co., Ltd.

TABLE 6

|  | Cross-cut tape test | |
| --- | --- | --- |
|  | PET | PC |
| Comparative Example 1 (composition B1) | 80/100 | 70/100 |
| Example 6 (composition A3) | 90/100 | 100/100 |

Example 7

An ink composition was produced according to the composition ratio as shown in the following table by a usual method. The thus obtained composition (hereinafter, abbreviated as "composition A4") had a viscosity of 80 mPa·s at 25° C.

TABLE 7

| Ingredients | Ratio |
| --- | --- |
| Cyracure UVR 6105 | 36% by mass |
| BOP | 39% by mass |
| Cyracure UVI 6992 | 5% by mass |
| Water | 10% by mass |
| DPP | 10% by mass |
| Dispersant | (1 mass part)*[1] |

(*[1]: "1 mass part" of the dispersant means a blending ratio of the dispersant per 100 mass parts of the total mass of ingredients other than the dispersant.)

Abbreviations in the table are as follows.
Cyracure UVR 6105: 3,4-epoxycyclohexylmethyl-3',4'-epoxycyclohexane carboxylate ("Cyracure UVR 6105" manufactured by The Dow Chemical Company)
Cyracure UVI 6992: a sulfonium salt-based photoinitiator solution ("Cyracure UVI 6992" manufactured by The Dow Chemical Company)
BOP: BOP obtained in example 1
DPP: diketopyrrolopyrrole (red pigment)
Dispersant: a dispersant "Disperbyk 111" manufactured by BYK-Chemie GmbH

Comparative Example 2

An ink composition was produced according to the composition ratio as shown in the following table by a usual method. The thus obtained composition (hereinafter, abbreviated as "ink composition B2") had a viscosity of 55 mPa·s at 25° C.

TABLE 8

| Ingredients | Ratio |
| --- | --- |
| Cyracure UVR 6105 | 36% by mass |
| 3-ethyl-3-hydroxymethyloxetane | 39% by mass |
| Cyracure UVI 6992 | 5% by mass |
| Water | 10% by mass |
| DPP | 10% by mass |
| Dispersant | (1 mass part)*[2] |

(*[2]: "1 mass part" of the dispersant means a blending ratio of the dispersant per 100 mass parts of the total mass of ingredients other than the dispersant.)

Abbreviations in the table are as follows.
Cyracure UVR 6105: 3,4-epoxycyclohexylmethyl-3',4'-epoxycyclohexane carboxylate ("Cyracure UVR 6105" manufactured by The Dow Chemical Company)
Cyracure UVI 6992: a sulfonium salt-based photoinitiator solution ("Cyracure UVI 6992" manufactured by The Dow Chemical Company)
DPP: diketopyrrolopyrrole (red pigment)
Dispersant: a dispersant "Disperbyk 111" manufactured by BYK-Chemie GmbH

[Adhesive Test]

The ink composition A4 obtained in example 7 and the ink composition B2 obtained in comparative example 2 were coated in a thickness of 6 μm on PET substrates and polycarbonate substrates, by which coat films were obtained. The thus obtained coat films were cured by a fusion H bulb (120 W/cm) at a UV-energy of 500 mJ/cm$^2$, and were evaluated for the adhesive test by an X-cut tape test.

Specifically speaking, two 4 cm-cuts were made into the cured coat film with a 45 degree angle. A tape having a predetermined adhesion strength was strongly applied over the cuts and then removed. After the removal, the remaining area of the coat film was rated with the following scale: "100/100" completely remained; "80/100" 80% remained; and "70/100" 70% remained. The tape used herein was "CT-405A" manufactured by Nichiban Co., Ltd.

TABLE 9

|  | Cross-cut tape test | |
| --- | --- | --- |
|  | PET | PC |
| Comparative Example 2 (ink composition B2) | 80/100 | 70/100 |
| Example 7 (ink composition A4) | 100/100 | 100/100 |

The invention claimed is:

1. A radiation curable composition comprising, as essential ingredients, a cationically polymerizable compound (a) represented by the following formula 1

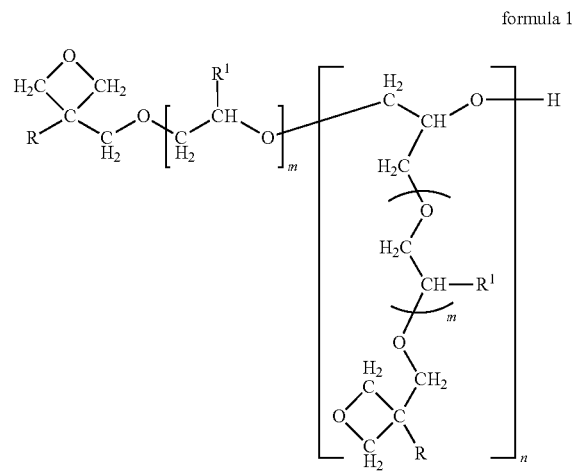

formula 1 wherein, R represents an alkyl group of 1 to 10 carbon atoms, R$^1$ represents a hydrogen atom or a methyl group, n represents a number from 1 to 4, and m represents a number from 0 to 10;
a cationic photoinitiator (b); and
water (c).

2. A radiation curable composition according to claim 1, further comprising a polyfunctional cationically polymerizable compound (d) selected from the group consisting of a polyfunctional epoxy compound, a polyfunctional vinyl ether compound, and a polyfunctional oxetane compound, in addition to the ingredients (a) to (c).

3. A radiation curable composition according to claim 2, wherein the polyfunctional cationically polymerizable compound (d) is the polyfunctional epoxy compound.

4. A radiation curable composition according to claim 2, wherein the respective ingredients (a) to (d) are compatibilized by mixing and stirring.

5. A radiation curable composition according to any one of claim 1 through claim 3, wherein the cationically polymerizable compound is represented by the following formula 1'

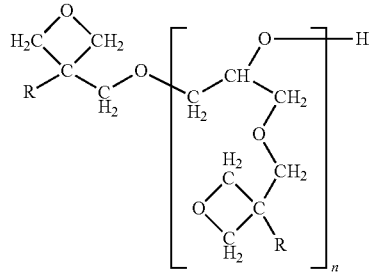

formula 1' wherein, R represents an alkyl group of 1 to 10 carbon atoms, and n represents a number from 1 to 4.

6. A radiation curable composition according to claim 1, wherein the respective ingredients (a) to (c) are compatibilized by mixing and stirring.

7. A method for producing a radiation curable composition, comprising:
reacting an oxetane alcohol represented by the following formula 2 with an epihalohydrin in the presence of a basic catalyst at a temperature of 25° C. to 30° C., to thereby obtain a cationically polymerizable compound (a) represented by the following formula 1

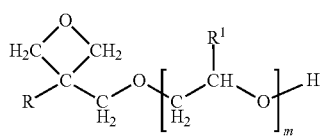

formula 2 wherein, $R^1$ represents a hydrogen atom or a methyl group, and m represents a number from 0 to 10, and

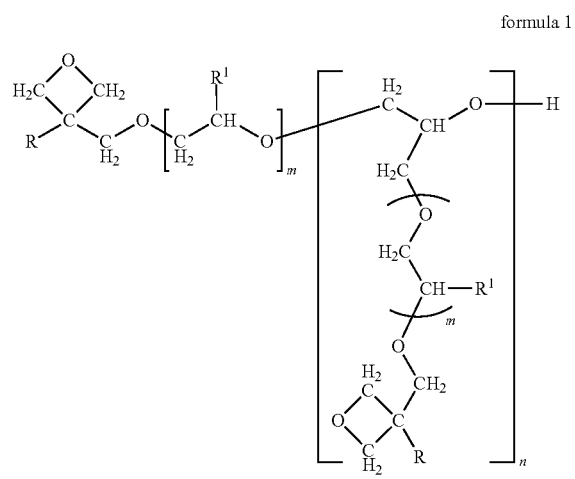

formula 1 wherein, R represents an alkyl group of 1 to 10 carbon atoms, $R^1$ represents a hydrogen atom or a methyl group, n represents a number from 1 to 4, and m represents a number from 0 to 10 (step 1);
mixing and stirring the obtained cationically polymerizable compound (a) with water (c) to thereby obtain a compatibilized aqueous solution (step 2); and then adding a photoinitiator (b) to the obtained aqueous solution (step 3).

8. A method for producing a radiation curable composition according to claim 7, wherein the ratio of the oxetane alcohol, the epihalohydrin, and the basic catalyst used in the step 1 is within a range of 3/1/1.2 to 1.5/1/1.1 on a molar basis.

* * * * *